United States Patent [19]

Midgley

[11] Patent Number: 4,540,739
[45] Date of Patent: Sep. 10, 1985

[54] ADHESIVE POLYMER LATEX

[75] Inventor: Charles A. Midgley, Sarnia, Canada

[73] Assignee: Polysar Limited, Ontario, Canada

[21] Appl. No.: 598,926

[22] Filed: Apr. 10, 1984

[51] Int. Cl.³ .......................... C08L 93/04; C08K 5/09
[52] U.S. Cl. ...................................... 524/764; 524/812; 524/818; 524/819; 524/821; 524/822; 524/823; 524/824
[58] Field of Search ............... 524/812, 818, 819, 821, 524/822, 823, 824, 764, 457–458

[56] References Cited

U.S. PATENT DOCUMENTS

| Re. 27,269 | 1/1972 | Miller | 524/821 |
|---|---|---|---|
| 2,754,280 | 7/1956 | Brown et al. | 260/29.6 |
| 2,959,821 | 11/1960 | Kolb | 18/58.6 |
| 3,047,548 | 7/1962 | Garrett | 524/812 |
| 3,242,121 | 3/1966 | Hill | 524/824 |
| 3,262,803 | 7/1966 | Baeder et al. | 525/245 |
| 3,677,991 | 7/1972 | Moore | 260/29.6 H |
| 3,806,484 | 4/1974 | Dargan | 524/812 |
| 3,809,666 | 5/1974 | Chick et al. | 524/818 |
| 3,817,899 | 6/1974 | Tuerck | 524/822 |
| 3,875,101 | 4/1975 | MacLeod | 524/818 |
| 3,896,085 | 7/1975 | Larsson et al. | 524/818 |
| 3,986,994 | 10/1976 | Teer et al. | 524/818 |
| 4,017,443 | 4/1977 | Tuerck et al. | 524/821 |
| 4,144,212 | 3/1979 | Linder et al. | 524/818 |
| 4,316,830 | 2/1982 | Mallon | 524/833 |
| 4,356,229 | 10/1982 | Brodnyan et al. | 524/824 |
| 4,358,403 | 11/1982 | Distler et al. | 524/821 |
| 4,419,481 | 12/1983 | Schwartz | 524/822 |
| 4,440,895 | 4/1984 | Heins et al. | 524/821 |

FOREIGN PATENT DOCUMENTS

| 808713 | 3/1969 | Canada . |
| 1017492 | 9/1977 | Canada . |
| 1030699 | 5/1978 | Canada . |
| 137593 | 9/1979 | German Democratic Rep. . |
| 51-38321 | 3/1976 | Japan . |
| 57-31972 | 2/1982 | Japan . |
| 848808 | 9/1960 | United Kingdom . |
| 1085833 | 10/1967 | United Kingdom . |

Primary Examiner—Herbert S. Cockeram
Attorney, Agent, or Firm—Stevens, Davis, Miller & Mosher

[57] ABSTRACT

Aqueous based pressure sensitive adhesives having improved shear properties are prepared from a latex of a monomer composition selected from the group:

(a)
  (i) from about 60 to 99.5 weight percent of an ester of acrylic or methacrylic acid; and
  (ii) from about 0.5 to about 40 weight percent of a $C_{3-9}$ ethylenically unsaturated carboxylic acid;

(b)
  (i) from about 40 to 99 weight percent of a $C_{4-8}$ conjugated diolefin;
  (ii) optionally up to about 60 weight percent of a vinyl aromatic monomer;
  (iii) from about 0.5 to about 40 weight percent of a $C_{3-9}$ *ethylenically unsaturated carboxylic acid; and*

(c)
  (i) from about 1 to 40 weight percent of a $C_{2-4}$ monoolefin;
  (ii) from about 60 to 99.5 weight percent of a vinyl ester; and
  (iii) from about 0.5 to 40 weight percent of a $C_{3-9}$ ethylenically unsaturated carboxylic acid;

said latex having been neutralized to a pH of equal to or greater than about 6 with an alkali metal hydroxide or salt. The polymer may optionally have a molecular weight distribution so that from about 20 to 55 weight percent of it has a molecular weight greater than 320,000. The adhesive may optionally include tackifiers. The resulting adhesives may be used in the manufacture of tapes and labels.

30 Claims, No Drawings

ADHESIVE POLYMER LATEX

BACKGROUND OF THE INVENTION

The present invention pertains to aqueous based adhesives having improved shear strength.

Due to rising costs and environmental concern there has been significant interest in developing adhesives which do not utilize hydrocarbon solvents. There are two options available to adhesive manufacturers who wish to minimize the use of hydrocarbon solvents. The manufacturer may use a hot melt adhesive or an aqueous based adhesive. Aqueous based adhesives are relatively simple to use and do not require extensive equipment modification over solvent based adhesive systems. Aqueous based adhesives have come under the criticism that they do not provide sufficient shear strength. There exists a need to develop aqueous based adhesives, and particularly pressure sensitive adhesives having improved shear strength.

It has been found that the shear strength of adhesives based on latexes containing functional groups such as carboxylic acid, amide, aldehyde and anhydrides of dicarboxylic acids, may be improved by the post polymerization neutralization of such latexes with a monovalent metal alkali. Without wishing to be bound by theory, it is believed that the size of the monovalent ion contributes to the shear strength developed and that the smaller the monovalent metal ion the higher the shear strength.

There is a significant body of art relating to the use of multi-valent metal ions, amines or diamines to cross link polymers. Such methods are disclosed in Polysar Limited's Canadian Pat. Nos. 1,017,492 and 1,030,699 issued Sept. 13, 1977 and May 2, 1978, respectively, relating to high green strength rubber. In the latex field the use of multi-valent ions, amines and diamines to coagulate and/or cross link latex has also been disclosed.

U.S. Pat. No. 2,754,280 issued July 10, 1956 assigned to the Rohm and Haas Company discloses the formation of crosslinked films by coagulated dispersions of polymers containing acid or ester functional groups with a polyvalent metal ion. The coagulated films are "to all intents and purposes dispersions of crosslinked resins because pairs of carboxyl groups in various molecular chains are joined together, i.e. are crosslinked by the atoms of the polyvalent metals "(col. 1 lines 57 to 61)". A similar process is disclosed in U.S. Pat. No. 2,959,821 issued Nov. 15, 1960 and assigned to Farbenfabriken Bayer Aktiengesellschaft.

Processes for preparing latex useful as a binder in carpet backing applications are known in which a carboxylated latex is neutralized with ammonium hydroxide. Such latices are cured in the absence of heavy metal ions. These types of processes are disclosed in Canadian Pat. No. 808,713 issued Mar. 18, 1969 to the Dunlop Rubber Company and East German Pat. No. 137,593 published July 10, 1978 in the name of VEB Chemische Werke Buna.

It is also known to impregnate webs with a latex of a functional polymer and to expose the impregnated web to amine vapour. The amine produces an in situ "thickening" of the latex.

The above art all teaches away from the use of monovalent ions as crosslinking agents. The conventional theory of ionic crosslinking requires a divalent metal compound or an ammonium complex. Thus, the use of a monovalent ion to cross link a functional polymer goes against the current state of the art.

British Patent Specification No. 1,085,833 published Oct. 4, 1967 in the name of Uniroyal discloses an adhesive for corrugated paper board comprising a carboxylated latex, a proteinaceous or carbohydrate binder and a crosslinking agent. The preferred crosslinking agents are urea formaldehyde or melamine formaldehyde resins. Complexes of polyvalent metal ions are also suitable as crosslinking agents. This art teaches away from the present case in that it does not suggest the use of a monovalent metal ion as a crosslinking agent. Furthermore there is no teaching that the carboxylated latex should be neutralized with a fixed alkali.

U.S. Pat. No. 3,677,991 issued July 18, 1972, assigned to the Dow Chemical Company discloses a method of gelling a latex high in acrylate and containing from about 1.5 to 8 percent of a carboxylic acid monomer. The latex is irreversibly coagulated with a strong base, preferably ammonium hydroxide, but sodium hydroxide, potassium hydroxide and ethylene diamine are also suitable. The patent teaches that surfactant coverage on the latex particles is less than 100%. Coagulation does not take place until the pH is from 8.8 to 10.1. The patent does not teach that the gelled latex is useful as an adhesive.

Japanese Kokai No. 76/38,321 published Mar. 31, 1976 in the name of Dainippon Ink and Chemicals discloses a latex of a polymer containing from 20 to 80% of unsaturated carboxylic acid, 5 to 50% of butadiene and 0 to 75% of other comonomers. The latex when neutralized with ammonium hydroxide to a pH of 9 is useful as an adhesive for tiles.

Japanese Kokai No. 83/31,972 published Aug. 5, 1980 in the name of Sango-Kokusaku Pulp Co. Ltd. discloses a composition for use as a release coating. The composition is a latex of a copolymer of a $C_{4-10}$ alkylacrylate, and ethylenically unsaturated carboxylic acid, and a vinyl compound (ethylene dimethacrylate) which has been treated with 0.2 to 1 equivalents of sodium acetate per equivalent of carboxylic acid. The document teaches that sodium ions provide better release properties than those obtained with calcium ions. The polymer of the Japanese Kokai contains ethylene dimethacrylate, a crosslinking agent, rather than the $C_{2-4}$ monoolefin as required in the present invention.

British Pat. No. 848,808, published Sept. 21, 1960 in the name of the International Latex Corporation, teaches a binder for non-woven webs. The binder comprises 60 to 75% of one or more dienes of from 4 to 10 atoms, from 1 to 30% of a vinyl compound and from 1 to 39% of a monocarboxylic acid. Following polymerization the latex may be neutralized with ammonium hydroxide, an organic base or sodium hydroxide. The patent does not disclose any preference for neutralization with sodium hydroxide. Furthermore, the patent does not teach that such latices are useful as adhesives.

SUMMARY OF THE INVENTION

According to the present invention there is provided an adhesive comprising a latex of a polymer having a Tg less than about 0° C., formed by emulsion polymerizing a monomeric mixture from the group comprising:

(a)
  (i) from about 60–99.5 weight % of a $C_{1-8}$ alkyl or alkanol ester of acrylic or methacrylic acid; or a mixture thereof and (ii) from 0.5 to about 40 weight % of a $C_{3-9}$ ethylenically unsaturated acid; and (iii) from 0 up to about 5 weight % of an amide of a $C_{3-9}$ ethylenically unsaturated acid which amide may be unsubstituted or substituted at the nitrogen atom by a $C_{1-8}$ alkyl or alkanol radical; a $C_{3-9}$ ethylenically unsaturated aldehyde; or an anhydride of a $C_{4-8}$ ethylenically unsaturated dicarboxylic acid; or a mixture thereof;

(b)

(i) from 0 to about 60 weight % of a vinyl aromatic monomer which may be unsubstituted or substituted by a $C_{1-4}$ alkyl radical or a chlorine or bromine atom;

(ii) from 40 to 99 weight % of a mixture comprising 100 to 50 weight % of a $C_{4-8}$ conjugated diolefin and 0 to 50 weight % of a $C_{1-8}$ alkyl or alkanol, or a $C_{2-8}$ alkenyl or alkenol ester of a $C_{3-9}$ ethylenically unsaturated acid;

(iii) from about 0.5 to 10 weight % of a $C_{3-9}$ ethylenically unsaturated acid; and (iv) from 0 up to about 5 weight % of an amide of a $C_{3-9}$ ethylenically unsaturated acid which amide may be unsubstituted or substituted at the nitrogen atom by a $C_{1-8}$ alkyl or alkanol radical; a $C_{3-9}$ ethylenically unsaturated aldehyde; or an anhydride of a $C_{4-8}$ ethylenically unsaturated dicarboxylic acid; or a mixture thereof, and (c)

(i) up to about 40 weight % of a $C_{2-4}$ mono-olefin unsaturated monomer;

(ii) from about 60 to 99.5 weight % of a $C_{1-8}$ alkyl or alkanol ester of a $C_{3-12}$ ethylenically unsaturated carboxylic acid or a $C_{2-8}$ alkenyl or alkenol ester of a $C_{1-12}$ saturated carboxylic acid or a mixture thereof; and (iii) from about 0.5 to 10 weight % of a $C_{3-9}$ ethylenically unsaturated acid; and (iv) from 0 up to about 5 weight % of an amide of a $C_{3-9}$ ethylenically unsaturated acid which amide may be unsubstituted or substituted at the nitrogen atom by a $C_{1-8}$ alkyl or alkanol radical; a $C_{3-9}$ ethylenically unsaturated aldehyde; or an anhydride of a $C_{4-8}$ ethylenically unsaturated dicarboxylic acid; or a mixture thereof;

wherein the adhesive has been adjusted to a pH of equal to or greater than about 6 with an agent selected from hydroxides and salts of lithium, sodium, potassium and a mixture thereof.

DESCRIPTION OF PREFERRED EMBODIMENTS

Latexes useful in accordance with the present invention may be classified as acrylic latices, carboxylated styrene-butadiene latexes optionally containing an acrylate or methacrylate ester, and functional vinyl ester latexes.

The acrylic latices generally comprise a polymer of from about 0.5 to 40 weight %, usually from about 5 to 15 weight % of an acid monomer such as acrylic or methacrylic acid and up to about 10 weight % of another $C_{3-8}$ ethylenically unsaturated acid, or a mixture thereof, or optionally a derivative of such acids, and the balance an ester of acrylic or methacrylic acid.

The acid is usually a $C_{3-9}$ ethylenically unsaturated carboxylic acid. Suitable co-polymerizable acids include acrylic acid, methacrylic acid, crotonic acid, vinylacetic acid, butenoic acid, pentenoic acid, allylacetic acid, mesaconic acid, citraconic acid, hexenoic acid, muconic acid, heptenoic acid, octenoic acid, nonenoic acid, fumaric acid, itaconic acid, maleic acid, cinnamic acid, p-vinylbenzoic acid, and a mixture thereof.

In place of, or in conjunction with the acid the polymer may contain acid derivatives such as an amide of a $C_{3-9}$ ethylenically unsubstituted acid. The amide may be unsubstituted or substituted at the nitrogen atom by a $C_{1-8}$ alkyl or alkanol radical. Suitable amides include acrylamide, methacrylamide, α-isopropylacrylamide, cinnamamide and the amides of unsaturated acids such as butenoic acid, pentenoic acid, hexenoic acid, heptenoic acid, and octenoic acid. Depending on the chain length the unsaturation in the acid may occur between the 1 to 2 positions through the 8–9 positions. The amide radical may be substituted by alkyl or alkanol radicals containing up to 8 carbon atoms. The above amides represent the simplest homologues in the amide series up to octyl amides, or hydroxoctyl amides. The lower amides are more commercially available such as acrylamide, methacrylamide, and $C_{1-4}$ lower alkyl and alkanol derivatives thereof such as N-methylol acrylamide.

In place of, or in combination with either of the ethylenically unsaturated acids or amides discussed above the copolymer may contain up to 10 weight %, preferably up to about 5 weight % of a $C_{3-9}$ ethylenically unsaturated aldehyde. Suitable aldehydes include acrolein, methacrolein, butenaldehyde, pentenaldehyde, hexenaldehyde, heptenaldehyde, octenaldehyde, and nonenaldehyde. As noted above the position of the double bond may vary along the carbon backbone of the monomer. Some additional aldehydes include cyclic aldehydes such as cinnamaldehyde.

The functional group in the acrylate polymer may be introduced by polymerizing an anhydride of a $C_{4-9}$ ethylenically unsaturated dicarboxylic acid. Suitable anhydrides are exemplified by maleic anhydride and phthalic anhydride.

The acrylic polymer also contains from about 60–90 weight %, preferably from about 60 to 75 weight % of a $C_{1-8}$ alkyl or alkanol ester of acrylic or methacrylic acid. Suitable esters include methyl acrylate, methyl methacrylate, ethyl acrylate, ethyl methacrylate, hydroxyethyl acrylate, hydroxyethyl methacrylate, propyl acrylate, propyl methacrylate, butyl acrylate, butyl methacrylate, pentyl acrylate, pentyl methacrylate, hexyl acrylate, hexyl methacrylate, ethyl hexyl acrylate, ethyl hexyl methacrylate, heptyl acrylate, heptyl methacrylate, octyl acrylate, and octyl methacrylate. These monomers apart from hydroxy ethyl acrylate and hydroxy ethyl methacrylate may be substituted in the alkyl chain by a hydroxyl radical.

The styrene-butadiene type latices contain a polymer comprising up to about 60 weight % of a vinyl aromatic monomer, from about 40 to 99.5 weight % of a conjugated diolefin from about 0.5 to 10 weight % preferably not more than about 5 weight % of a functional monomer which is an ethylenically unsaturated acid, an amide of an ethylenically unsaturated acid, an ethylenically unsaturated aldehyde or an anhydride of an ethylenically unsaturated dicarboxylic acid. Optionally, up to about 50 weight percent of the butadiene may be replaced with a $C_{1-8}$ alkyl or alkanol or a $C_{2-8}$ alkenyl or alkenol ester of a $C_{3-9}$ ethylenically unsaturated acid, such as those discussed above in regard to the acrylate polymers.

Preferably the vinyl aromatic monomer is present in an amount from about 15 to 50 weight % of the polymer. Desirably the vinyl aromatic monomer is present in an amount from about 20 to 30 weight %. The vinyl aromatic polymer is preferably selected from styrene which is unsubstituted or substituted by a $C_{1-4}$ alkyl radical or a chlorine or bromine atom. Suitable vinyl aromatic monomers include, α-methyl styrene, p-methyl styrene, chlorostyrene and bromostyrene. Other vinyl aromatic monomers may be used in place of styrene.

The conjugated diolefin should contain from 4 to 9 carbon atoms. Preferably the conjugated diolefin is present in an amount from about 50 to 85 weight % of the polymer. Desirably the conjugated diolefin is present in an amount from about 70 to 80 weight %, most preferably about 75 weight %. The most commercially available conjugated diolefins are butadiene and isoprene.

The functional monomer may be an ethylenically unsubstituted acid, amide, aldehyde, or anhydride of a dicarboxylic acid. Suitable monomers have been discussed above with regard to the acrylate latexes. Preferably the functional monomer is used in amounts no greater than about 5 weight % of the polymer. It is most preferable if the total functional monomer is in the range from about 1 to 3.5 weight % of the total polymer. Mixtures of functional monomers are useful in accordance with the present invention. The most common combinations are unsaturated acid and unsaturated amide, and unsaturated acid and unsaturated aldehyde. For example the functional monomer may comprise about 2% amide and about 1.5% of carboxylic acid.

The functional vinyl ester latexes comprise up to about 40 weight % of a $C_{2-4}$ mono-olefin monomer; from about 60% to about 99.5 weight % of a $C_{1-8}$ alkanol ester of a $C_{3-12}$ ethylenically unsaturated carboxylic acid or $C_{2-8}$ alkenyl or alkenol ester of a $C_{1-12}$ saturated carboxylic acid and from about 0.5 to 10 weight % of a functioanl monomer as described above. Preferably the mono-olefin monomer is present in an amount from about 1 to 25 weight %, most preferably from about 10 to 15 weight %. Suitable mono-olefins are ethylene, propylene and butylene, with ethylene being preferred.

The ester component in the polymer may be a $C_{1-8}$ alkyl or alkanol ester of a $C_{3-12}$ ethylenically unsaturated acid or a $C_{2-8}$ alkenyl or alkenol ester of a $C_{1-12}$ saturated carboxylic acid. Suitable $C_{3-12}$ unsaturated carboxylic acids include acrylic acid, methacrylic acid, crotonic acid, pentenoic acid, hextenoic acid, hepetenoic acid, octenoic acid and their homologues. Suitable alcohols which may be reacted with the unsaturated acids are saturated mono and diols of from 2 to 8 carbon atoms such as ethanol, propanol, butanol, pentanol, hexanol, ethyl hexanol, heptanol, octanol, and diol homologues of the foregoing alcohols.

The esters may also be the reaction product of a $C_{2-8}$ unsaturated alcohol or diol and a $C_{1-12}$ saturated carboxylic acid. Suitable alcohols are the $C_{2-8}$ alkenols and alkendiols such as propenol, butenol, pentenol, hexenol, heptenol and octenol and their diol homologues. Suitable acids include formic acid, acetic acid, propionic, butanoic, valeric, caproic, heptanoic and octenoic acids.

The most common of the foregoing esters are vinyl acetate, vinyl propioniate, vinyl butanoate, and acrylate or methacrylate esters.

The functional monomer has been discussed above. It is preferably present in amounts not greater than about 5 weight %, most preferably from about 1–3 weight % of the total polymer consists of one or more functional monomers.

The molecular weight distribution of the polymer in the latex may be selected to provide improved tack. The selection of the molecular weight distribution of the SBR polymer is disclosed in applicants copending U.S. patent application No. 539,636 filed Oct. 7, 1983, now U.S. Pat. No. 4,508,864 which was a continuation of U.S. application Ser. No. 357,093 filed Mar. 11, 1982, now abandoned. In addition to the teaching in the aforesaid Canadian Patent application, it is desirable to use an SBR polymer having a molecular weight distribution so that up to about 90 weight % of the polymer has a molecular weight greater than about 320,000. Most preferably from about 20 to 55% of the polymer has a molecular weight greater than 320,000. The molecular weight distribution for a polymer in a latex may be determined by mixing the latex with a water compatible solvent for the polymer such as tetrahydrofuran. The insoluble polymer or gel will not dissolve in the solvent. A portion of the solvent and dissolved polymer is then passed through a gel permeation chromatograph column (GPC) to separate the polymer into fractions by molecular weight. The sum of the insoluble or gel content as a percent of the total polymer in the latex plus the percent of polymer with a molecular weight greater than 320,000 as determined by GPC will give the total percent of polymer having a molecular weight greater than 320,000.

The latices of the present invention may be manufactured using conventional emulsion polymerization processes. An emulsion of the monomers in water is prepared. The emulsion may be stabilized with a surfactant which may be anionic, nonionic, or a mixture of anionic and nonionic surfactants. Suitable anionic surfactants include alkali, metal and alkaline earth metal salts of alkyl ether sulfates, alkyl phosphates, alkyl aryl phosphates, alkyl sulfonates, alkyl aryl sulfonates, and the like. Commercially available surfactants are listed in "McCutcheon's Emulsifiers and Detergents" published annually. In some latexes such as vinyl acetate, it may be desirable to incorporate a protective colloid such as polyvinyl alcohol or a naturally occurring thickener or a derivative thereof such as carboxymethyl cellulose. The polymerization may be catalyzed by a redox-catalyst system or a free radical generating agent such as a peroxide. If desired a modifier such as t-dodecyl mercaptan or carbon tetrachloride may be employed. The reaction is short-stopped in a conventional manner. Up to this point all the procedures are conventional. Preferably, immediately following polymerization the latex is neutralized to a pH of at least about 6, preferably 6.5 to 8, with a monovalent fixed alkali. Optionally, the compounded latex may be neutralized with a monovalent fixed alkali to a pH of from about 6.5 to 8 provided the monovalent fixed alkali, or a salt of a monovalent alkali, is added prior to any other base. Suitably the bases include potassium hydroxide, sodium hydroxide or lithium hydroxide. The smaller the ion size of the alkali the greater the improvement in shear. The most practical base is sodium hydroxide. If desired the pH of the latex may be subsequently raised up to 14, preferably from about 8 to about 10 either using a monovalent fixed alkali base or any other type of base such as ammonia, or an amine. It is believed that the use of a fugitive base such as ammonium hydroxide in raising the pH from at least about 6 to the range 8 to 10 improves the hydrophobic properties of the adhesive.

Improved results are expected if the ingredients are selected to avoid chemicals which will generate ammonia or ammonium hydroxide during polymerization. Thus, it is advantageous to avoid the use of ammonium persulfate as a catalyst component and to avoid surfactants which will generate ammonia or ammonium hydroxide.

The adhesive of the present invention may include a tackifier resin. The tackifier resin optionally may be present in amounts up to about 170 parts by weight per 100 parts by weight of polymer. Conventionally the tackifier resin is present in an amount from about 15 to 100 parts by weight per 100 parts by weight of polymer.

The tackifier resin may be rosin or hydrogenated rosin, a synthetic hydrocarbon tackifier or an acrylate. Suitable rosin or hydrogenated rosin esters have a ring and ball softening temperature from about 25° C. to about 115° C. Preferred tackifiers have a softening temperature from about 50° C. to about 110° C. Useful hydrocarbon tackifiers may be manufactured from a $C_9$ aromatic monomer or a $C_5$ aliphatic monomer or a mixture thereof. These monomers are derived from the so-called $C_9$ and $C_5$ cuts in the fractionation of crude oil, or similar material. The synthetic hydrocarbon tackifier should have a ring and ball softening temperature from about 10° C. to about 100° C. Acrylic tackifier resins are polymerized from one or more monomers selected from the group comprising acrylic acid which is unsubstituted or substituted by a $C_{1-4}$ alkyl or alkoxyl radical, or $C_{1-6}$ alkyl or alkanol esters thereof.

The adhesives of the present invention may be applied to conventional substrates. The substrates may be non-woven cellulosic material for use as price labels, or product labels. The substrates may be polymeric material such as a polyolefin. This type of substrate is used to manufacture adhesive tapes.

The substrate is usually relatively thin material, usually no greater than about ⅛" in thickness. However, the present invention contemplates that the adhesives could be used on other types of substrates. In the manufacture of tapes and labels the substrate is a relatively thin sheet material. The sheet material may be a polymeric material which is flexible at about room temperature. The sheet material may be a homopolymer of an ethylenically unsaturated monomer such as ethylene, propylene or vinyl chloride, provided the substrate has sufficient flexibility for the desired end use. The substrate may also be a copolymer containing an ethylenically unsaturated monomer such as ethylene, propylene, vinyl chloride, and one or more copolymers selected from unsaturated mono- or di-carboxylic acid monomers such as maleic acid, fumaric acid, acrylic acid, methacrylic acid, adipic, propenoic, butenoic, and pentenoic acids, an ester monomer, such as $C_9$–$C_{15}$ esters of such acids, or an amide monomer having about 4–10 carbon atoms. Thus, the sheet material may be polyester or a polyamide. The substrate may be made from cellulosic or reconstituted cellulosic material such as rayon. The substrate need not be a sheet material but may be composed of fibers which may be woven, or non woven as is the case in paper. The woven substrate may be made from cellulosic material, such as cotton or from fibers of any of the above-mentioned polymers.

The composition is applied to the substrate using conventional coating techniques such as roller coaters, blade coaters, meyer rods or air coaters. The coated substrate is then dried usually by passing it through a heating tunnel or oven which may use circulating hot air or infrared lamps to dry the coated substrate. The drying time will be a function of a number of factors such as the heat capacity of the subsrate, the type of heating, the oven temperature, air velocities (if circulating air is used) and the rate of passage of the substrate through the oven or heating tunnel. The manufacturer may readily determine suitable time/temperature relationships to determine optimum drying conditions in his equipment for the product.

The substrate should be coated with sufficient adhesive to provide a dry coat weight from about 10 to about 35 pounds per 3,000 square feet. Generally, in the manufacture of tapes using a continuous sheet polymeric substrate dry coat weight of about 17–18 pounds per 3,000 square feet are used. In the manufacture of labels a dry coating weight from about 12 to about 18 pounds per 3,300 square feet is usually used. In the manufacture of masking tape, a dry coating weight from about 25 to 35 pounds per 3,000 square feed is usually used.

After drying, the coated substrate is cut to the required dimension. In the manufacture of tape the substrate is cut into strips and rolled to provide a finished product. The substrate may also be cut into shaped items to provide labels or medicinal tapes. These processes are known to those in the tape industry.

The following examples are intended to illustrate the scope of the invention, and are not intended to limit the invention.

A styrene butadiene carboxylic latex was prepared using conventional emulsion polymerization techniques. The monomeric mixture comprised about 25% styrene, about 2% itaconic acid and the balance butadiene. The latex was stripped of residual monomers and then subjected to different treatments.

A sample of latex was untreated. A sample of latex was neutralized with ammonium hydroxide to pH's of 7, 8.5 and 10. A sample of latex was neutralized to pH's of 7, 8.5 and 10.1 with sodium hydroxide. Samples of the latices were then blended with 30 parts of a hydrogenated rosin ester (Stabelite Ester 10 [trademark]) per 100 parts of polymer. The samples were then applied to a Mylar (trademark) film at a cost weight of about 23 g/m² and a thickness of about 1 mil. The coating was dried and the resulting tape subjected to a standard shear (PSTC) test using 1000 g weight. The time until the weight and tape fell off the plate was recorded. Table I records the results.

TABLE I

| Latex | Time to Shear Failure (hours) |
|---|---|
| Control | 0.8 |
| Control + NH₄OH (pH 7) | 9.9 |
| Control + NH₄OH (pH 8) | 9.0 |
| Control + NH₄OH (pH 10) | 15.5 |
| Control + NaOH (pH 7) | 70.0 |
| Control + NaOH (pH 8) | 70.0 |
| Control + NaOH (pH 10.1) | 70.0 |
| Control + tackifier | 0.1 |
| Control + NH₄OH (pH 7) + tackifier | 0.1 |
| Control + NH₄OH (pH 8) + tackifier | 0.2 |
| Control + NH₄OH (pH 10) + tackifier | 0.2 |
| Control + NaOH (pH 7) + tackifier | 1.9 |
| Control + NaOH (pH 8) + tackifier | 2.7 |
| Control + NaOH (pH 10.1) + tackifier | 1.9 |

The tack of the adhesives was compared using a rolling ball test. The tack of the samples at pH of 8 or less was substantially similar. In the samples at pH greater than 10 there was some decrease in the tack of the adhesive.

To illustrate the present invention a water based acrylate adhesive was prepared in accordance with Run #2 of Example 1 of U.S. Pat. No. 4,316,830. Following polymerization and the addition of t-butyl perbenzoate and the sodium formaldehyde sulfoxylate, the latex was divided into three samples. One sample had a pH of about 3.9 and was not neuralized. One sample was neutralized to a pH of 8.5 with sodium hydroxide and one sample was neutralized to a pH of 8.5 with ammonium hydroxide. Sample tapes were made and tested in accordance with the procedures described in the 830 patent. The results are set forth in Table II.

TABLE II

| Latex | Shear ($\frac{1}{2}'' \times 1'' \times 1$ kg) hours | 180° peel 5 min. (lb/in) |
|---|---|---|
| not neutralized | Mean 3.1 | 2.04 |
| pH 8.5 NH$_4$OH | Mean 3.6 | 1.78 |
| pH 8.5 NaOH | Mean 73.8 | 1.67 |

The neutralization of the acrylate latex with sodium hydroxide resulted in about a 30-fold increase in the time to shear failure relative to the unneutralized sample, and the sample neutralized with ammonium hydroxide. Neutralization with sodium hydroxide marginally reduced the 180° peel but not sufficiently to cause serious concern.

What is claimed is:

1. An aqueous based pressure sensitive adhesive having improved shear properties comprising a latex of a polymer having a Tg less than about 0° C., formed by emulsion polymerizing a monomeric mixture selected from the group comprising:

(a)
   (i) from about 60–99.5 weight percent of a $C_{1-8}$ alkyl or alkanol ester of acrylic or methacrylic acid; or a mixture thereof and
   (ii) from 0.5 to about 40 weight percent of a $C_{3-9}$ ethylenically unsaturated acid; and
   (iii) from 0 up to about 5 weight percent of an amide of a $C_{3-9}$ ethylenically unsaturated acid which amide may be unsubstituted or substituted at the nitrogen atom by a $C_{1-8}$ alkyl or alkanol radical; a $C_{3-9}$ ethylenically unsaturated aldehyde; or an anhydride of a $C_{4-8}$ ethylenically unsaturated dicarboxylic acid; or a mixture thereof;

(b)
   (i) from about 0 to about 60 weight percent of a vinyl aromatic monomer which may be unsubstituted or substituted by a $C_{1-4}$ alkyl radical or a chlorine or bromine atom;
   (ii) from 40 to 99 weight percent of a mixture comprising 100 to 50 weight percent of a $C_{4-8}$ conjugated diolefin and 0 to 50 weight percent of a $C_{1-8}$ alkyl or alkanol, or a $C_{2-8}$ alkenyl or alkenol ester of a $C_{3-9}$ ethylenically unsaturated acid;
   (iii) from about 0.5 to 10 weight percent of a $C_{3-9}$ ethylenically unsaturated acid; and
   (iv) from 0 up to about 5 weight percent of an amide of a $C_{3-9}$ ethylenically unsaturated acid which amide may be unsubstituted or substituted at the nitrogen atom by a $C_{1-8}$ alkyl or alkanol radical; a $C_{3-9}$ ethylenically unsaturated aldehyde; or an anhydride of a $C_{4-8}$ ethylenically unsaturated dicarboxylic acid; or a mixture thereof; and (c)
   (i) from about 1 to about 40 weight percent of a $C_{2-4}$ monoolefin monomer;
   (ii) from about 60 to 99.5 weight percent of a $C_{1-8}$ alkyl or alkanol ester of a $C_{3-12}$ ethylenically unsaturated carboxylic acid or a $C_{2-8}$ alkenyl or alkenol ester of a $C_{1-12}$ saturated carboxylic acid or a mixture thereof; and
   (iii) from about 0.5 to 10 weight percent of a $C_{3-9}$ ethylenically unsaturated acid; and
   (iv) from 0 up to about 5 weight percent of an amide of a $C_{3-9}$ ethylenically unsaturated acid which amide may be unsubstituted or substituted at the nitrogen atom by a $C_{1-8}$ alkyl or alkanol radical; a $C_{3-9}$ ethylenically unsaturated aldehyde; or an anhydride of a $C_{4-8}$ ethylenically unsaturated dicarboxylic acid or a mixture thereof;

which has been adjusted to a pH of equal to or greater than about 6 with an agent selected from hydroxides and salts of lithium, sodium, potassium and a mixture thereof.

2. An adhesive according to claim 1 wherein the latex is adjusted to a pH of from 6 to about 8.5, following polymerization, with an agent selected from hydroxides and salts of lithium, sodium, potassium and a mixture thereof.

3. An adhesive according to claim 2 wherein said polymer is formed by polymerizing a monomeric mixture comprising:
   (i) from about 5 to 15 weight % of acrylic acid, methacrylic acid or a mixture thereof;
   (ii) from about 60–90 weight % of a $C_{1-8}$ alkyl or alkanol ester of acrylic or methacrylic acid; and
   (iii) from 0 to about 10 weight % of a $C_{3-9}$ ethylenically unsaturated acid other than acrylic or methacrylic acid; and
   (iv) from 0 up to about 5 weight % of an amide of a $C_{3-8}$ ethylenically unsaturated acid which amide may be unsubstituted or substituted at the nitrogen atom by a $C_{1-8}$ alkyl or alkanol radical; a $C_{3-9}$ ethylenically unsaturated aldehyde; or an anhydride of a $C_{4-8}$ ethylenically unsaturated dicarboxylic acid, or a mixture thereof.

4. An adhesive according to claim 2 wherein said polymer is formed by polymerizing a monomeric mixture comprising:
   (i) from 0 to 60 weight % of a vinyl aromatic monomer which may be unsubstituted or substituted by a $C_{1-4}$ alkyl radical or a chlorine or bromine atom;
   (ii) from about 40 to 99.5 weight % of a $C_{4-8}$ conjugated diolefin;
   (iii) from about 0.5 to 10 weight % of a $C_{3-9}$ ethylenically unsaturated acid; and
   (iv) from 0 up to about 5 weight % of an amide of a $C_{3-9}$ ethylenically unsaturated acid which amide may be unsubstituted or substituted at the nitrogen atom by a $C_{1-8}$ alkyl or alkanol radical; a $C_{3-9}$ ethylenically unsaturated aldehyde; or an anhydride of a $C_{4-8}$ ethylenically unsaturated dicarboxylic acid; or a mixture thereof.

5. An adhesive according to claim 2 wherein said polymer is formed by polymerizing a monomeric mixture comprising:
   (i) from about 0 to about 15 weight percent of a $C_{2-4}$ monoolefin monomer;

(ii) from about 60 to 99.5 weight percent of a $C_{1-8}$ alkyl or alkanol ester of a $C_{3-12}$ ethylenically unsaturated carboxylic acid or a $C_{2-8}$ alkenyl or alkenol ester of a $C_{1-12}$ saturated carboxylic acid or a mixture thereof; and (iii) from about 0.5 to 10 weight percent of a $C_{3-9}$ ethylenically unsaturated acid; and (iv) from 0 up to about 5 weight percent of an amide of a $C_{3-9}$ ethylenically unsaturated acid which amide may be unsubstituted or substituted at the nitrogen atom by a $C_{1-8}$ alkyl or alkanol radical; a $C_{3-9}$ ethylenically unsaturated aldehyde; or an anhydride of a $C_{4-8}$ ethylenically unsaturated dicarboxylic acid; or a mixture thereof.

6. An adhesive according to claim 4 wherein in said monomeric mixture said $C_{3-9}$ ethylenically unsaturated acid is present in an amount of from 0.5 to 5 weight % and said amide is present in an amount from 0 to 5 weight %.

7. An adhesive according to claim 6 wherein said ethylenically unsaturated acid is present in an amount from about 1 to about 3 weight %.

8. An adhesive according to claim 7 wherein said monomeric mixture contains from about 15 to 50 weight % of a vinyl aromatic monomer selected from styrene, p-methyl styrene, α-methyl styrene, chlorostyrene and a mixture thereof.

9. An adhesive according to claim 8 wherein said monomeric mixture contains from about 85 to 50 weight % of a conjugated diolefin selected from butadiene, isoprene, and a mixture thereof.

10. An adhesive according to claim 9 wherein the acid is selected from the group acrylic acid, methacrylic acid, fumaric acid, itaconic acid, maleic acid, cinnamic acid, and a mixture thereof.

11. An adhesive according to claim 10 wherein said polymer has a molecular weight distribution so that from about 20 to 55 weight % of the polymer has a molecular weight greater than 320,000.

12. An adhesive according to claim 10 wherein said amide is present in an amount from about 1 to 3 weight % and is selected from acrylamide, methacrylamide, N-methylolacrylamide, and a mixture thereof.

13. An adhesive according to claim 12 wherein said polymer has a molecular weight distribution so that from about 20 to 55 weight % has a molecular weight greater than 320,000.

14. An adhesive according to claim 4 wherein in said monomeric mixture said acid is present in an amount from 0.5 to about 5 weight % and is selected from acrylic acid, methacrylic acid, fumaric acid, maleic acid, itaconic acid, and cinnamic acid, and said aldehyde is present in an amount from 0.5 to 5 weight % and is selected from acrolein, methacrolein and cinnamaldehyde.

15. An adhesive according to claim 14 wherein said polymer has a molecular weight distribution so that from about 20 to 55 weight % has a molecular weight greater than 320,000.

16. An adhesive according to claim 2 wherein the pH of the latex is adjusted to about 7 with an hydroxide of sodium, potassium or lithium, and then subsequently raised from a pH of about 8 to 10 with ammonium hydroxide, or an organic base.

17. An adhesive according to claim 11 wherein the pH of the latex is adjusted to about 7 with an hydroxide of sodium, potassium or lithium, and then subsequently raised from a pH of about 8 to 10 with ammonium hydroxide, or an organic base.

18. An adhesive according to claim 3 wherein in said monomeric mixture said $C_{3-9}$ ethylenically unsaturated acid other than acrylic or methacrylic acid is present in an amount of from 0.5 to 5 weight % and said amide is present in an amount from 0 to 5 weight %.

19. An adhesive according to claim 5 wherein in said monomeric mixture said $C_{3-9}$ ethylenically unsaturated acid is present in an amount of from 0.5 to 5 weight % and said amide is present in an amount from 0 to 5 weight %.

20. An adhesive according to claim 11 further containing a tackifier in an amount from about 15 to about 100 parts by weight per 100 parts by weight of polymer which is selected from:

(a) rosin or a hydrogenated rosin ester which has a ring and ball softening temperature from about 25° to 115° C.;

(b) a synthetic hydrocarbon tackifier resin having a ring and ball softening temperature from about 10° to about 100° C. manufactured from a $C_9$ aromatic monomer, or a mixture of tackifiers manufactured from a $C_9$ aromatic monomer, and a $C_5$ aliphatic monomer; and (c) an acrylic resin selection from polymers of one or more of acrylic acid which is unsubstituted or substituted by a $C_{1-4}$ alkyl or alkoxy radical, or $C_{1-6}$ alkyl esters thereof.

21. An adhesive according to claim 13 further containing a tackifier in an amount from about 15 to about 100 parts by weight per 100 parts by weight of polymer which is selected from:

(a) rosin or a hydrogenated rosin ester which has a ring and ball softening temperature from about 25° to 115° C.;

(b) a synthetic hydrocarbon tackifier resin having a ring and ball softening temperature from about 10° to about 100° C. manufactured from a $C_9$ aromatic monomer, or a mixture of tackifiers manufactured from a $C_9$ aromatic monomer and a $C_5$ aliphatic monomer; and (c) an acrylic resin selected from polymers of one or more of acrylic acid which is unsubstituted or substituted by a $C_{1-4}$ alkyl or alkoxy radical, or $C_{1-6}$ alkyl esters thereof.

22. An adhesive according to claim 18 wherein said polymer has a molecular weight distribution so that from about 20 to 55 weight % has a molecular weight greater than 320,000.

23. An adhesive according to claim 19 wherein said polymer has a molecular weight distribution so that from about 20 to 55 weight % has a molecular weight greater than 320,000.

24. A sheet substrate coated with an adhesive composition according to claim 3.

25. A sheet substrate coated with an adhesive composition according to claim 4.

26. A sheet substrate coated with an adhesive composition according to claim 5.

27. A sheet substrate coated with an adhesive composition according to claim 11.

28. A sheet substrate coated with an adhesive composition according to claim 13.

29. A sheet substrate coated with an adhesive composition according to claim 22.

30. A sheet substrate coated with an adhesive composition according to claim 23.

* * * * *